United States Patent [19]

Gaultier

[11] Patent Number: 5,758,297
[45] Date of Patent: May 26, 1998

[54] METHOD FOR CONTROLLING NAVIGATION OF AN AIRCRAFT, AND INTERACTIVE FLIGHT INSTRUMENT PANEL TO IMPLEMENT SAID METHOD

[75] Inventor: Philippe Gaultier, Le Chesnay, France

[73] Assignee: Sextant Avionique, Meudon La Foret, France

[21] Appl. No.: 498,428

[22] Filed: Jul. 5, 1995

[30] Foreign Application Priority Data

Jul. 27, 1994 [FR] France .................. 94 09285

[51] Int. Cl.$^6$ .................. G06F 165/00; G08G 5/00
[52] U.S. Cl. .................. 701/14; 701/202; 701/209; 340/971; 340/995; 361/680
[58] Field of Search .................. 364/443, 444, 364/449, 424.06, 424.029, 448, 451, 424.01, 430, 708.1, 449.3, 444.2; 340/995, 990, 971, 973, 977, 979, 980; 342/401, 451, 452; 361/680, 681, 683

[56] References Cited

U.S. PATENT DOCUMENTS

| | | | |
|---|---|---|---|
| 4,577,194 | 3/1986 | Ragsdale | 342/401 |
| 4,692,869 | 9/1987 | King et al. | 364/448 |
| 4,825,374 | 4/1989 | King et al. | 364/443 |
| 4,827,419 | 5/1989 | Selby, III | 364/443 |
| 4,862,374 | 8/1989 | Ziemann | 364/449 |
| 5,041,982 | 8/1991 | Rathnam | 340/995 |
| 5,059,970 | 10/1991 | Raubeimer et al. | 342/451 |
| 5,189,632 | 2/1993 | Paajanen et al. | 364/705.05 |
| 5,340,061 | 8/1994 | Vaquier et al. | 244/175 |
| 5,384,844 | 1/1995 | Rydbeck | 379/443 |
| 5,526,265 | 6/1996 | Nakhla | 364/428 |
| 5,541,863 | 7/1996 | Magor et al. | 364/580 |

FOREIGN PATENT DOCUMENTS

| | | |
|---|---|---|
| 0388174 | 9/1990 | European Pat. Off. |
| 2637682 | 4/1990 | France . |
| 2664379 | 1/1992 | France . |
| 2188455 | 9/1987 | United Kingdom . |

*Primary Examiner*—Tan Q. Nguyen
*Attorney, Agent, or Firm*—Browdy and Neimark

[57] ABSTRACT

A method for preparing and controlling navigation of an aircraft uses a processor equipped with memories, a screen and keys. It comprises the steps of preparing the route to be followed by an aircraft by loading into the memory data pertaining to a route, defining parameters characterizing the environment in which the navigation will take place, and displaying during navigation a couple of way points including the last point through which the aircraft has passed and the next way point, the segment joining these two points together, and information required to control navigation between these two points. The invention enables the pilot to prepare his navigation without taking measurement readings and performing calculations.

13 Claims, 3 Drawing Sheets

FIG.5

| Est.GS | Calc.GS | Fuel | Range | ETA | Flight durat. | Total durat. | 18:08 |
|---|---|---|---|---|---|---|---|
| 115 | | 153 l | 04:43 | 18:43 | 00:07 | 00:17 | |

| BLOIS | | | R 18:01 | |
|---|---|---|---|---|
| 118.1 | | | | |
| 20° | 24Nm | 12'/15' | | |
| CHATEAUDUN | | | E 18:16 | PTV 116.5 264° |
| App 120.8 | | | R | CHW 115.2 151° |
| 21° | 36Nm | 19'/23' | | |

(diagram: vor EPR, PT3, S2, CHW, PT2, S1, PTV, S0, PT1)

FIG.6

| Est.GS | Calc.GS | Fuel | Range | ETA | Flight durat. | Total durat. | 18:18 |
|---|---|---|---|---|---|---|---|
| 112 | 111 | 147 l | 04:33 | 18:44 | 00:17 | 00:27 | |

| CHATEAUDUN | | | 18:16 | |
|---|---|---|---|---|
| App 120.8 | | | R 18:17 | |
| 21° | 36Nm | 19'/23' | | |
| VOR EPR | | | E 18:40 | PTV 116.5 322° |
| 115.65 | | | R | CHW 115.2 75° |
| 86° | 14Nm | 7'/8' | | |

(diagram: vor RMB, PT3, S2, CHW, PT2, S1, PTV, S0, PT1)

5,758,297

METHOD FOR CONTROLLING NAVIGATION OF AN AIRCRAFT, AND INTERACTIVE FLIGHT INSTRUMENT PANEL TO IMPLEMENT SAID METHOD

BACKGROUND OF THE INVENTION

1. Field of the Invention

This invention relates to a method for preparing and controlling aircraft navigation.

It is more particularly aimed at enhancing the security of the aircraft while reducing the burden on the pilot, by reducing the operations to be performed for in-flight modification of the navigational parameters, and by eliminating risks of error to a large extent.

2. Description of the Prior Art

In a general manner, it is known that the basic equipment of a pilot undertaking a journey on board an aircraft, more particularly of the type of the aircraft used in light aviation, is the flight instrument panel. Such a panel consists of a small tablet to which it is possible to attach a sheet of paper called navigation sheet or navigation "log". This log comes in the form of a table in which, prior to take-off, the pilot enters the elements required for the various stages of navigation.

The first elements to be entered are: the way points marking out the route planned (aerodromes, towns, radio navigation beacons, etc.), and the frequencies relating to the radio communication and radio navigation means available along the route. The pilot must then, by means of an aeronautical map and length and angle measuring instruments, take the distance and true heading readings between each of the points along his path. Finally, the pilot will calculate the magnetic headings and estimated times between each point and will enter them on his navigation sheet.

Immediately prior to departure, the pilot computes the effects of the wind on the headings and the times entered on his sheet and makes a note of the result for each segment of the flight.

Throughout the flight, the pilot, who must know his position at all times, follows his route sheet point by point, timing the duration of each segment, making a note of variances observed and recalculating his estimated time of passage at the next point.

OBJECT OF THE INVENTION

The main object of this invention is to remedy the preceding disadvantages, particularly to provide a method enabling the pilot to prepare his navigation without reading measurements and without performing the long and fastidious calculations enumerated above, and following navigational developments throughout the flight.

SUMMARY OF THE INVENTION

Accordingly, there is provided a method using a device comprising a processor equipped with a memory and a man/machine dialogue means that can comprise a viewing screen and a keyboard fitted with keys.

It comprises the following operational phases:

the preparing of the route to be followed by the aerodyne by loading in the above-mentioned memory a route already prepared and previously memorized on a medium, or by keying in the way points along the route by means of said keyboard;

the defining of the parameters characterizing the environment in which the navigation will take place (these parameters may consist of features of the aircraft, its load, wind speed and direction, and fuel taken on board);

the displaying of at least a first couple of way points as well as information required to control navigation between these points (this information may consist of the magnetic heading, distance, estimated time of passage at the next point with and without wind).

According to the invention, this method is characterized in that it comprises the updating of the displayed information by action on a function key as the aircraft passes over each way point, this action causing the erasing from the screen of the way point preceding the point entered and the displaying of a new way point following the previous displayed point, and the computing and displaying of new information taking into account the updating that has just been performed, and in that the route information loaded into the memory during the preparatory phase includes parameters relating to the way points marking out the planned route as well as to radio navigation aids marking each of these points, the search for the points and markers being carried out in an "Aerodromes and markers" database contained in the above-mentioned memory.

Advantageously, the device for implementing the method previously described could be in the form of a flight instrument panel comprising a flat case housing the electronic circuits of the processor and on one side of which are disposed said screen and said keyboard. This device can be supplied with electrical power by means of a battery of cells or accumulators housed inside the case or by means of an external converter that can be plugged into an external socket provided on the case.

By way of its shape, dimensions and appropriate ergonomics, such a flight instrument panel is particularly suited to use on board an aircraft.

BRIEF DESCRIPTION OF THE DRAWINGS

Further features and advantages of the invention will be apparent from a sample embodiment of the interactive flight instrument panel according to the invention described, by way of a non-limiting example, in reference to the corresponding accompanying drawings in which:

FIGS. 5 and 6 represent a specimen display used by the method according to the invention.

DESCRIPTION OF THE PREFERRED EMBODIMENTS

Figure 1:
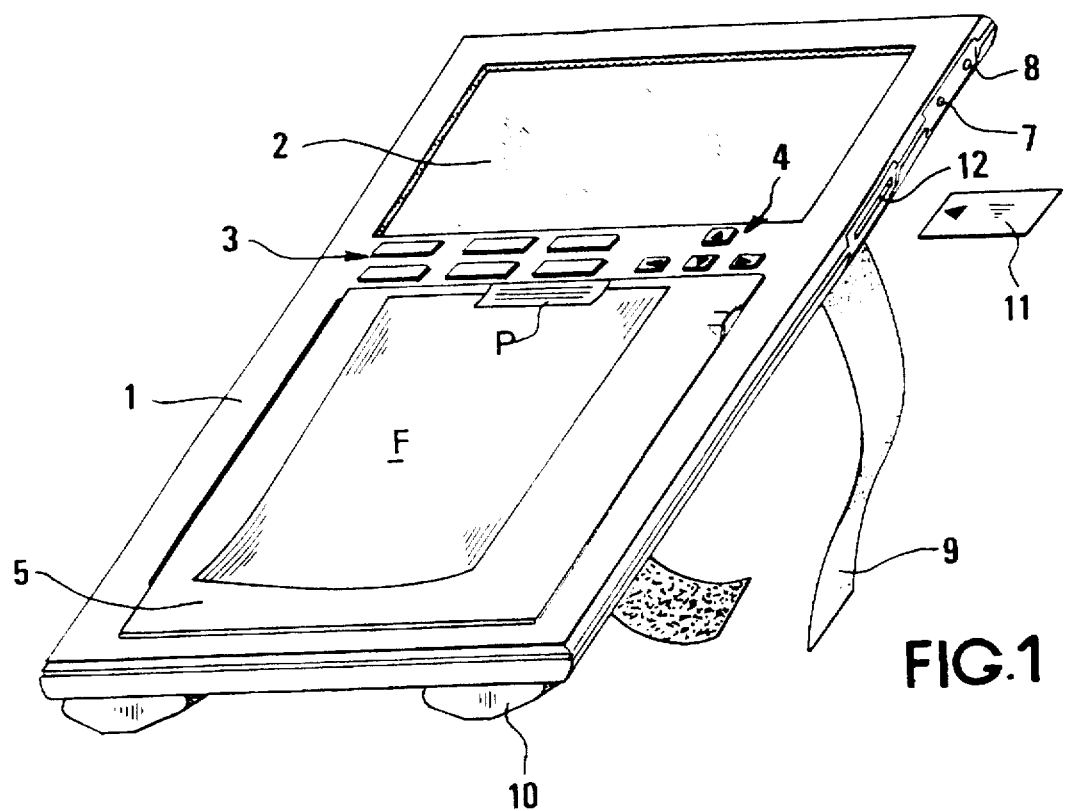
FIGS. 1 and 2 represent a perspective view of the interactive flight instrument panel.
Figure 2:
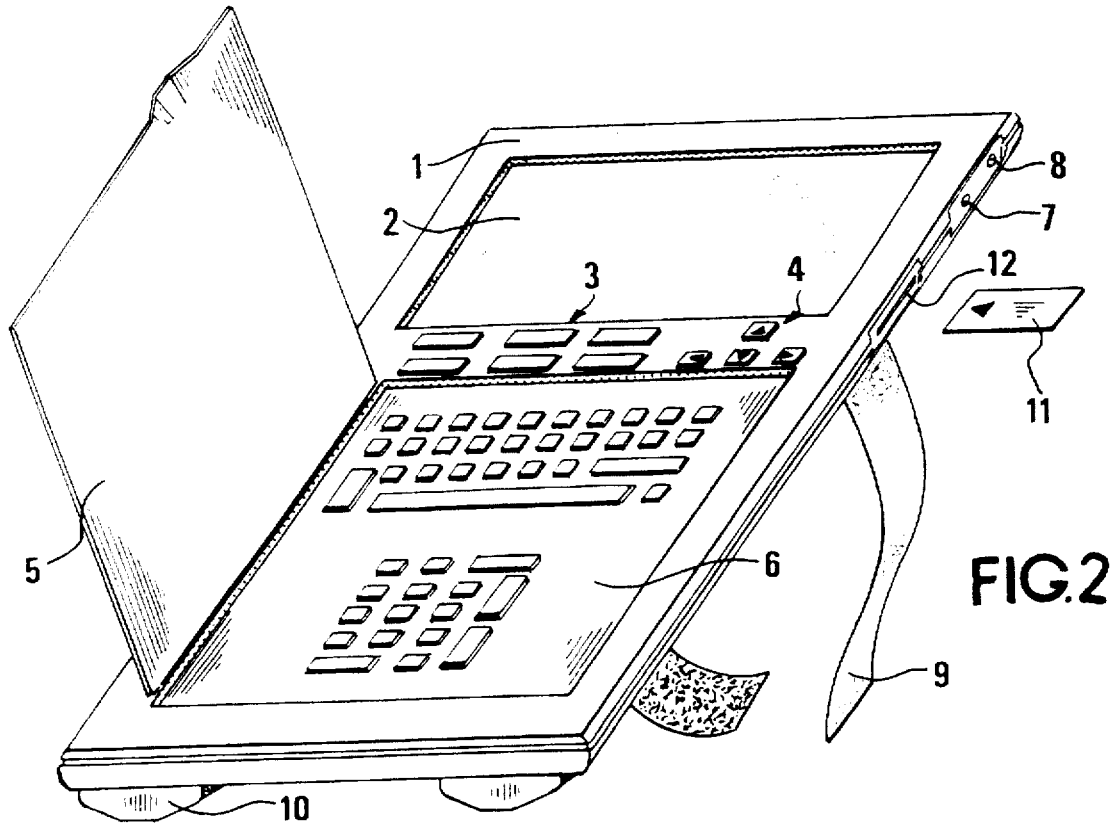
Figure 3:
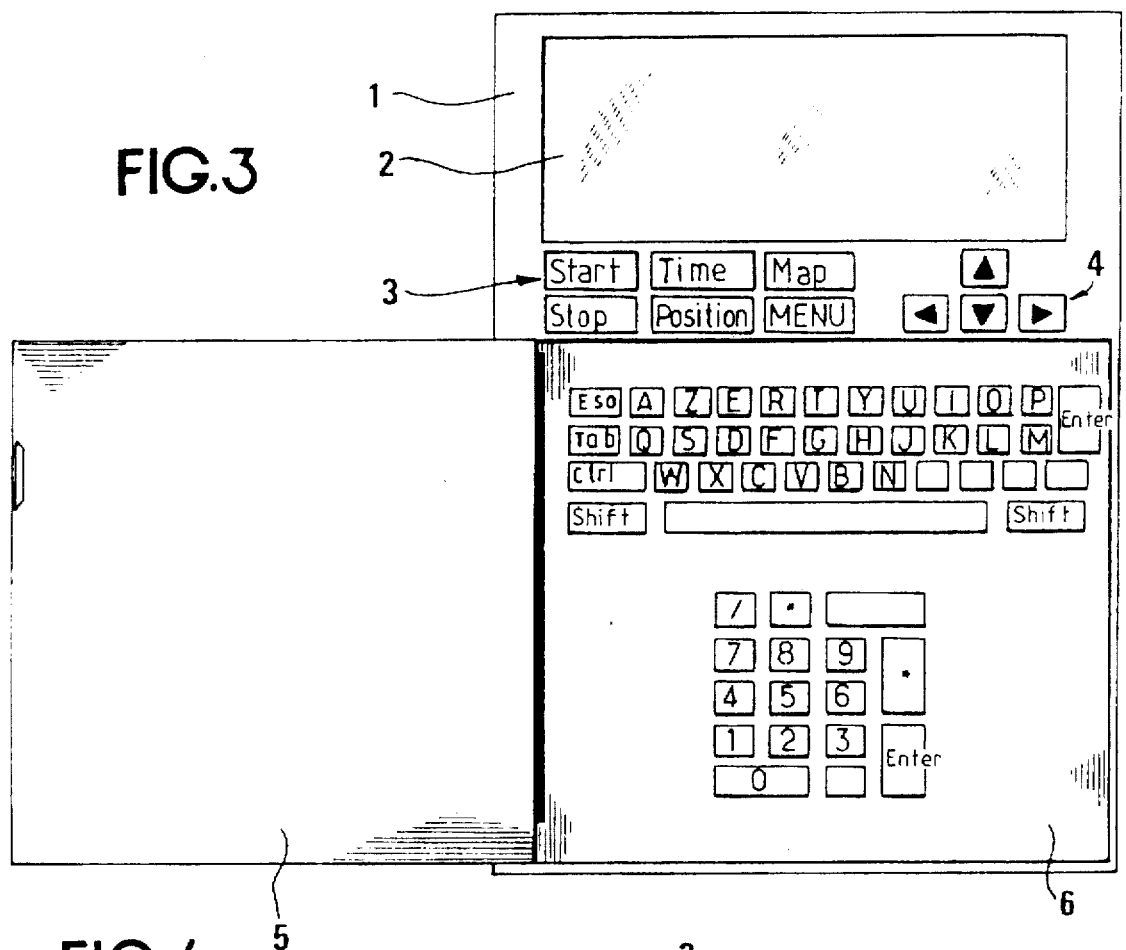
FIG. 3 represents a top view of the interactive flight instrument panel.

As represented in FIGS. 1 to 3, the interactive flight instrument panel is comprised of a flat case 1 housing a processor and of which the upper wall comprises three successive zones, i.e.

a viewing zone equipped with a screen 2, e.g. of the liquid crystal display type, a first dialogue zone comprising a set of function keys 3, in this instance the "Start", "Stop", "Time", "Position", "Map" and "MENU" keys, as well as four directional keys 4 disposed in conventional manner, a second dialogue zone equipped with a means enabling information to be entered, this means consisting of an alphanumeric keyboard 6 in this instance.

A rigid flap 5 is mounted pivotally about a hinge oriented parallel to a lateral edge of the case 1 so as to be susceptible of folding over the second dialogue zone to mask the keyboard 6. Furthermore, this flap is fitted with a means such as an elastic clip P enabling a sheet F or block of sheets of paper to be secured, so that, in the folded back position of the flap, the panel can serve as a conventional instrument panel while enabling dialogue with the processor due to the fact that the viewing zone and first dialogue zone remain uncovered.

Figure 4:
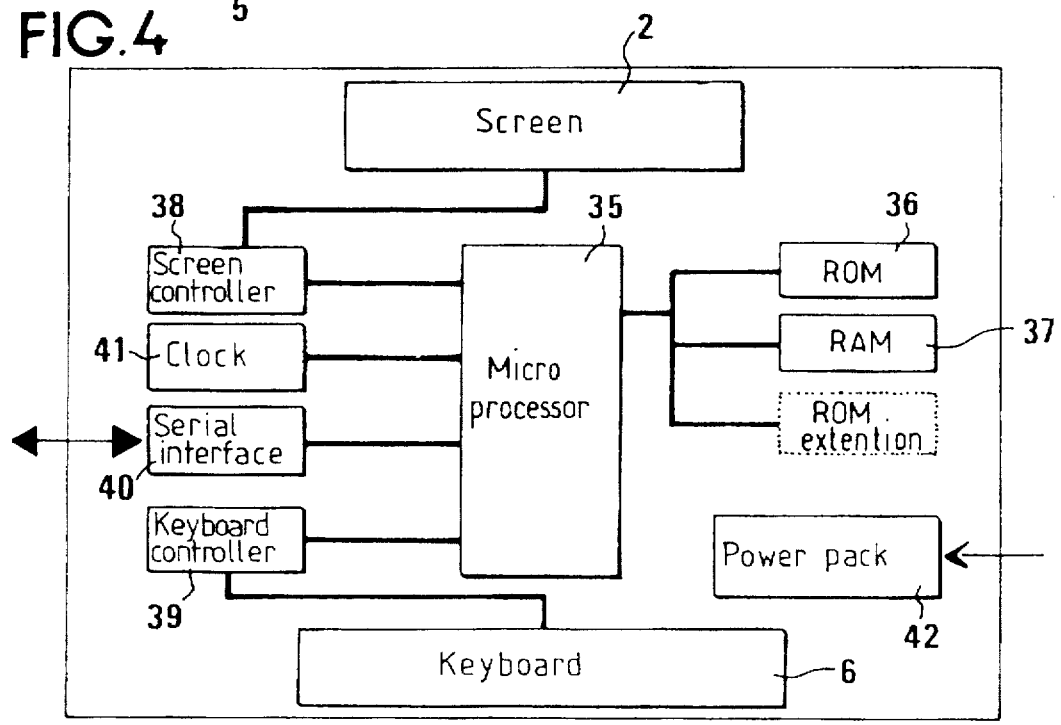
FIG. 4 represents a specimen synopsis of the electronics managing the interactive flight instrument panel.

The flight instrument panel is managed by the microprocessor 35, the latter being associated with ROM 36 and RAM 37 memories, a screen controller 38, a controller 39 for the keys of the keyboard 2 and keys of the first dialogue zone, a serial line controller 40 and a clock 41 (FIG. 4).

The electric power supply to the electronic circuit of the panel (block 42) is an autonomous system using cells or batteries. An external power supply is also possible via an optional voltage converter that can be connected to a connector 7 fitted on the right-hand lateral edge of the case 1.

A connection for a printer or microcomputer is possible by means of the RS 232 type serial link (interface 20) accessible by a connector 8.

A housing 12 also formed in the right-hand lateral edge enables an optional memory board 11 to be inserted.

The lower wall of the interactive flight instrument panel is equipped with an elastic strap 9 ended by VELCRO type securing means. This strap enables the flight instrument panel to be secured to the pilot's thigh, a position particularly suited to the configuration of the cockpit of an aircraft.

Good positional retention is ensured by the shape of the lower wall of the case which comprises two longitudinal protuberances 10.

The dimensions of the case may be e.g. the following: 250 mm long, 160 mm wide and 15 mm deep.

The viewing screen 2 can consist of a monochrome or colour graphic display of approximately 480×160 points. As an example, this screen uses LCD technology in the reflective mode.

The alphanumeric keyboard 6, used especially during the pre-flight preparatory phase, can be masked by the flap 5 thus forming a tablet enabling a sheet of paper to be lodged for note taking during the flight.

The four function keys 3, as well as the four directional keys 4 are used in flight to monitor and control navigation. They are therefore accessible at all times.

In principle, the electronics of the flight instrument panel are permanently powered up. It is then possible to switch to a minimum consumption mode by simultaneously pressing the "Start" and "Stop" keys, thereby causing the screen to turn off without loss of information. Return to the normal mode of utilisation is obtained by pressing the "Start" key.

The method used according to the invention offers a set of functions accessible via a menu presented on the viewing screen when the "MENU" function key has been pressed. These functions are as follows:

NAVIGATION/Parameters: this function enables the parameters required for the flight to be initialized: true airspeed of the aircraft, magnetic deviation at departure and arrival, wind speed and direction, quantity of fuel taken on board, load, etc.

NAVIGATION/Preparation: this function enables the entering of the points marking out the planned route, as well as the radio navigation aids marking each of these points. The points and markers are automatically searched for in an "Aerodromes and beacons" database contained in the memory of the interactive flight instrument panel.

NAVIGATION/Display: this function enables the entire active navigation log to be displayed. The different points are displayed, as is the following information: altitude, ICOA aerodrome identification code, radio frequencies, orientation of runways, etc., all this information having been automatically searched for in the "Aerodromes and beacons" database.

The distance and times with and without wind, as well as the headings are calculated as a function of the geographical coordinates presented in the "Aerodromes and beacons" database and are then displayed.

NAVIGATION/Modify: this function enables the memorized flight plan to be modified.

NAVIGATION/Plan: this function enables a graphical representation of the entire planned route to be displayed.

NAVIGATION/En route: this function enables interactive in-flight utilisation of the active navigation log.

As illustrated in FIGS. 5 and 6, this function, once it has been selected, enables the displaying of the current time 13, the information on the next two flight segments S1, S2; the names 14, 29 of the first and second way points PT1, PT2; any corresponding frequencies 15, the magnetic heading 16, the distance 17, the time without wind 18 and the time with wind 19. A graphic 20 representing the next two flight segments S1, S2 and any radials PTV, CHW marking the next way point PT2, on a fix having the axis of the aircraft as vertical axis, is also displayed. The scale used for the graphical representation is calculated automatically to take up all the available space on the screen, irrespective of the length of the flight segments S1, S2.

The entire flight plan can be scrolled through by using the vertical directional keys.

For each flight segment S1, S2, the ground speed of the aircraft 21 is computed as a function of the wind and is then displayed.

When the engine(s) of the aircraft are started up, a pressing of the "Start" key triggers the timer indicating the total "engine" duration 22. The remaining range 23 and the quantity of fuel left, calculated as a function of the fuel taken on board, the type of aircraft and the amount of time lapsed 22, are then displayed.

Upon passing over the first point PT1, an action on the "Map" key activates the automatic flight plan monitoring. The time of passage 25 over the point PT1 is displayed in the corresponding box. The estimated time of arrival 26 at the next way point PT2, the estimated time of arrival at the final destination 27 and the duration of the flight 28 are displayed. The real ground speed 29 calculated on the last segment SO is displayed.

To control navigation, the pilot need only operate the "Map" key at the passing over each point and follow the information presented by the electronic log.

It is possible at all times to return to the parameters menu, to perform modifications there and then return to follow the navigation log.

The next point PT2 on the route 20 is marked by one or two radials 31, PTV, CHW represented by the name of the radio beacon, its frequency, and the magnetic bearing of this beacon in relation to said point PT2.

NAVIGATION/Position: this function enables the aircraft to be located by establishing a fix by means of radio navigation marker readings (e.g. VOR or ADF). This function can be called up automatically by pressing the "Position" key.

When this function is called up via the NAVIGATION/En route function, the position of the aircraft is stated, by default, in relation to the next point on the planned route. In other words, the heading to reach this point (block 31) and the distance separating it from the aircraft (block 32) and the time with and without wind (block 33) are displayed. A graphical representation of the aircraft in relation to the planned route is also displayed.

FILE/Load: this function enables a flight plan to be selected from among all the flight plans in the memory.

FILE/Save: this function enables the active flight plan to be saved in the memory.

DATA/Add coord: this function enables points identified by the geographical coordinates (latitude and longitude) to be added to the "Aerodromes and beacons" database.

DATA/Add radial: this function enables points identified by a radial (bearing and distance) of any point in the database to be added to the "Aerodromes and beacons" database.

DATA/Add aircraft: this function enables a "new aircraft" (parameters of a new aircraft) to be added to the "Aerodromes and beacons" database.

DATA/Modify: this function enables the data in the "Aerodromes and beacons" and "Aircraft" databases to be modified.

INFORMATION/Field: this function enables the information relating to a field to be displayed. The next field along the route is proposed by default.

INFORMATION/Aircraft: this function enables the technical information on the aircraft contained in the "Aircraft" database to be displayed. The aircraft selected in the parameters menu is proposed by default.

WEIGHT/: this function enables the displaying of the results of the weight and balance calculations as a function of the parameters automatically collected in the "Aircraft" database and of the load data entered by the pilot.

A graphical representation of weight and balance in relation to the aircraft's limits is displayed.

I claim:

1. A method for preparing and controlling navigation of an aircraft, said method using a device comprising a processor equipped with memories and a man/machine dialogue means comprising a viewing screen and a set of keys, said method comprising the steps of:

preparing a planned route comprising a succession of route segments delimited by way points, to be followed by the aircraft by loading in said memories information relating to said planned route, said information being stored in said memories in a database comprising parameters relating to way points and radio navigation aids marking said way points, and having been previously memorized on a medium, or being keyed by means of said set of keys;

defining parameters characterizing an environment in which the navigation will take place;

displaying, during navigation, at least a route segment delimited by a last way point over which the aircraft has passed and a next way point, and information required to control navigation between these points; and each time the aircraft passes over the previously displayed next way point, updating the displayed information subsequent to an action on a function key, said action causing the previously displayed route segment to be erased from said screen and a next route segment and corresponding information to be displayed, said next route segment being delimited by the last way point over which the aircraft has passed and a next way point, said corresponding information being previously retrieved in said database, and computed.

2. The method as claimed in claim 1, further comprising a displaying step of an entire active navigation log and information contained in said database, said information comprising altitude, airdrome identification codes, radio frequencies and orientation of runways, this step comprising calculating distances and times with and without wind.

3. The method as claimed in claim 1, further comprising an in-flight flight plan modification step.

4. The method as claimed in claim 1, further comprising, during navigation, displaying current time, information on next two route segments comprising names of the last and next way points, frequencies, magnetic heading, distance, time without wind and time with wind, and displaying a graphic representing at least said next two flight segments and two possible radials marking the next way point, on a fix having an axis of said aircraft as vertical axis.

5. The method as claimed in claim 1, further comprising counting a time lapsing from starting up of engines of the aircraft, and calculating and displaying remaining range and remaining amount of fuel as a function of fuel taken on board, type of aircraft and amount of time lapsed.

6. The method as claimed in claim 1, wherein said updating comprises displaying time of passage over said last way point, estimated time of arrival at the next way point, estimated time of arrival at a final destination and duration of the flight.

7. The method as claimed in claim 6, wherein said updating further comprises displaying real ground speed computed for the last segment traveled.

8. The method as claimed in claim 1, further comprising locating the aircraft by means of radio navigation beacons.

9. The method as claimed in claim 1, wherein the parameters characterizing the environment in which the navigation will take place comprise features of the aircraft, its load, wind speed and direction, and fuel taken on board.

10. A device for preparing and controlling navigation of an aircraft, said device comprising:

a case of small thickness having a shape of a flight instrument panel and having an upper wall which is equipped with a dialogue means comprising at least a viewing zone equipped with a viewing screen, a first dialog zone comprising a set of function keys, and a second dialogue zone equipped with a means enabling information to be entered, inside said case, a processor associated with memories, a screen controller, a controller for all the keys, a clock, and a means for connecting a memory board, said memories storing information related to a planned route to be followed by said aircraft, said planned route comprising a succession of route segments delimited by way points, said viewing screen displaying at least a current route segment over which said aircraft is flying and information related to said current segment, said first dialogue zone comprising a function key for triggering updating of the displayed information each time the aircraft passes over a way point, and a rigid flap for supporting a paper sheet for note taking, which is mounted pivotally about a hinge oriented parallel to a lateral edge of the case so as to be susceptible of folding over the second dialogue zone without covering up said screen and said first zone.

11. The device as claimed in claim 10, wherein said flap is equipped with a means enabling a sheet or block of sheets of paper to be secured.

12. The device as claimed in claim 10, wherein said case has a lower wall comprising two longitudinal protuberances.

13. The device as claimed in claim 10, wherein said case has a lower wall which is equipped with an elastic strap ended by a securing means, said strap being intended to enable said case to be secured to the pilot's thigh.

* * * * *